Jan. 13, 1925.

W. ASBURY 1,523,160

OPERATING MECHANISM FOR CAMERAS

Filed Oct. 14, 1921

2 Sheets-Sheet 1

Inventor
WILLIAM ASBURY.

By Earnest Reed
Attorney

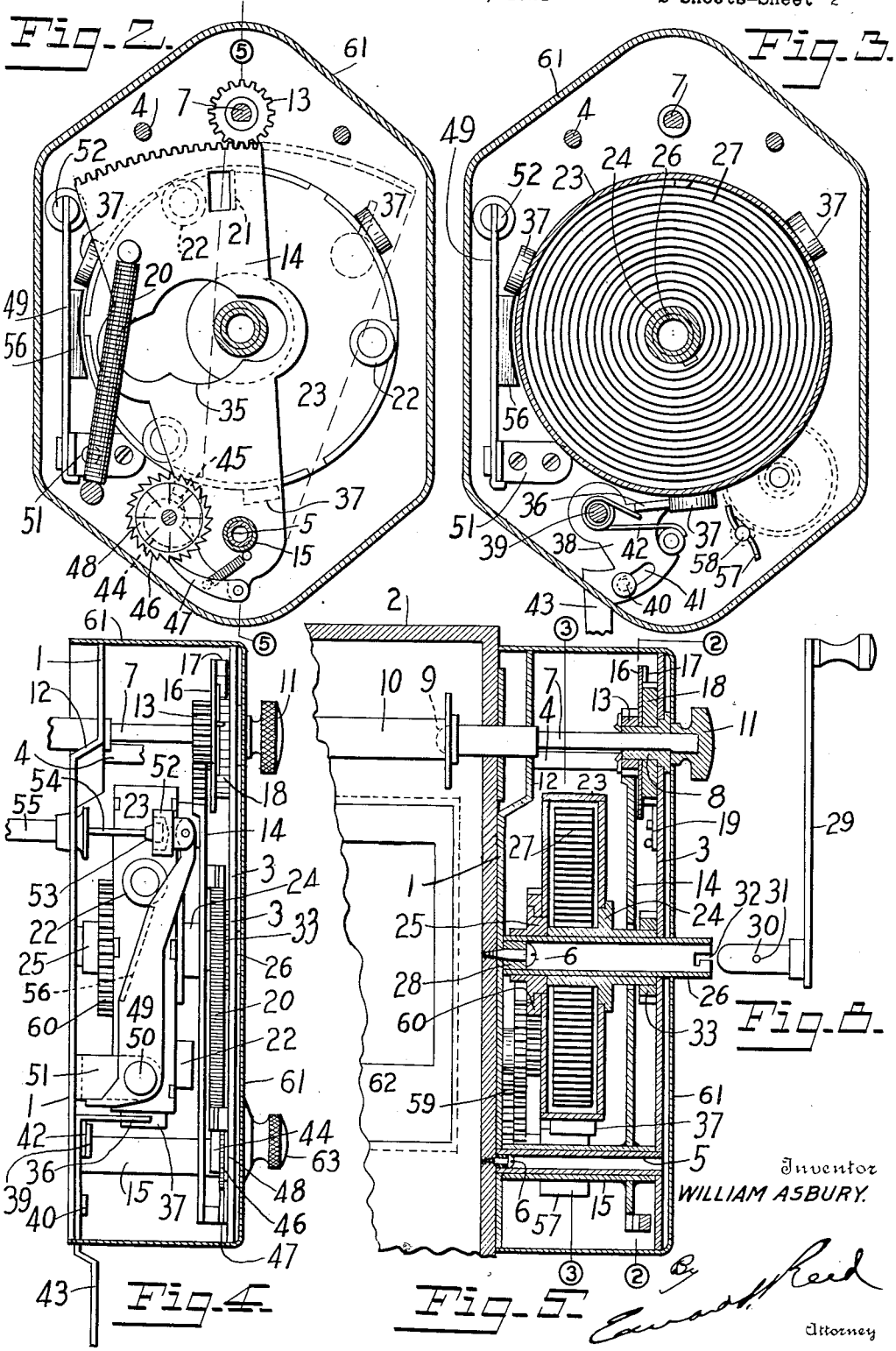

Patented Jan. 13, 1925.

1,523,160

UNITED STATES PATENT OFFICE.

WILLIAM ASBURY, OF NEW YORK, N. Y., ASSIGNOR TO THE VENUGRAPH COMPANY, A CORPORATION OF OHIO.

OPERATING MECHANISM FOR CAMERAS.

Application filed October 14, 1921. Serial No. 507,745.

*To all whom it may concern:*

Be it known that I, WILLIAM ASBURY, a subject of the King of Great Britain, residing at #512 East 159th St., New York, in the county of New York and State of New York, have invented certain new and useful Improvements in Operating Mechanisms for Cameras, of which the following is a specification, reference being had therein to the accompanying drawing.

This invention relates to operating mechanism for cameras and the like.

One object of the invention is to provide an operating mechanism for a camera which will advance the film and operate the shutter successively, to enable a series of exposures to be taken in rapid succession and which will be simple in its construction and positive in its operation.

A further object of the invention is to provide such a device which will be power operated and will operate continuously and automatically under the control of the operator.

A further object of the invention is to provide such a device which can be applied to an ordinary hand camera without modification of the latter.

Other objects of the invention will appear as the device is described in detail.

In the accompanying drawings Fig. 1 is a side elevation of an ordinary hand camera, showing my invention applied thereto; Fig. 2 is a section taken on the line 2—2 of Fig. 5; Fig. 3 is a section taken on the line 3—3 of Fig. 5; Fig. 4 is a side elevation of the mechanism with the casing in section; Fig. 5 is a sectional view taken on the line 5—5 of Fig. 2; Fig. 6 is a detail view of the governor; Fig. 7 is a detail view of the cam for controlling the length of film advanced; and Fig. 8 is a detail view of the operating handle.

The present invention is in the nature of an improvement on the device shown and described in Patent No. 1,358,919, granted Nov. 16, 1920 to Charles H. Arnold, and assigned to the Venugraph Co. In the present drawings I have illustrated one embodiment of the invention and have shown the same as an attachment adapted to be applied to an ordinary hand camera, but it will be understood that the mechanism may, if desired, be built into the camera and form a permanent part thereof. Further, it will be understood that the particular device here shown has been chosen for the purposes of illustration only and that various modifications may be made therein without departing from the spirit of the invention. In that form of the device here illustrated the mechanism comprises a main frame consisting of a base member 1 adapted to be secured to the edge of a hand camera 2, the base plate in the present instance being of a width considerably greater than the width of the camera. An outer plate 3 is rigidly secured to the base plate 1 by posts, or elongated studs, 4, at one end of the frame and by a hollow stud, or post, 5 at the other end of the frame. This hollow post 5 may be utilized to receive one of the screws 6 by means of which the frame is attached to the camera, thus enabling the screws to be inserted when the mechanism is fully assembled. Arranged between the frame members 1 and 3 is suitable mechanism for advancing or feeding the film forward step by step and, as here shown, I have mounted a rod, or stem, 7 in one end of the main frame for connection with the film spool in the camera. As here shown, this stem is slidably mounted in a bushing 8 journaled in the outer frame member 3 but is held against rotation in that bushing. The inner end of the stem is journaled in the base, or inner frame member, 1 and extends through the wall of the camera and is provided with lugs 9 to enter the slots in the end of the film spool 10. In applying the device to the camera the usual device for actuating the film spool is removed and the present device substituted therefor. The stem 7 is provided at its outer end with a knob 11 by means of which longitudinal movement may be imparted thereto for connecting the same with and disconnecting it from the film spool. Preferably the base plate 1 has an offset portion 12, in which the stem 7 is journaled, which will permit the device to be attached to the camera without removal of the escutcheon plate, or of the attaching devices for the carrying straps. Loosely mounted on the stem 7 is a gear 13 which meshes with a toothed actuating member 14 arranged in the upper part of the frame and pivotally mounted therein at that end of the frame remote from the gear 13. In the present instance the actuating member is in the form of a sector shaped plate, and is pivotally mounted on the connecting post 5, it being preferably provided with an elongated bearing, or sleeve, 15 which is journaled on the post 5 and which serves to hold the plate in a fixed plane. Rigidly connected with the gear 13 is a plane, or disk, 16 which carries a spring pressed pawl 17 adapted to engage a ratchet wheel 18 rigidly mounted on the bushing 8, the pawl being so arranged that when the gear is actuated the ratchet wheel will be rotated in a direction to wind the film onto the spool 10 and when the gear is rotated in the opposite direction by the return movement of the actuating plate, the pawl will ride over the teeth of the ratchet wheel, the latter being held against movement in a reverse direction by a detent pawl 19.

The actuating plate is returned to and held in its normal position by a spring 20 connected at one end with the plate and at the other end with a fixed part of the frame. Means are provided for moving the plate against the tension of the spring to actuate the film spool, this movement of the plate being positively controlled to cause a proper length of film to be advanced upon each operation of the plate. In the present construction the plate is provided with a projection, or lug, 21, extending inwardly therefrom and arranged in the path of the projection 22 carried by an operating device 23 which, in the present instance, is rotatable and is mounted on an axis arranged between the axis of the plate and the lug on the plate. Consequently, the rotation of this operating member will cause the projection 22 to engage the lug 21 and move the plate until the lug is moved out of the path of the projection 22, due to the different radii about which the two devices operate. In the present instance the projection 22 is in the form of a roller and the rotatable operating device is provided with three of these rollers spaced equal distances apart thereon so that the actuating plate will be operated three times for each rotation of the operating member. The operating member may be of any suitable construction and may be operated in any suitable manner and in the present construction it is power operated, being driven by a spring motor which will rotate it continuously in one direction, subject to the control of the operator. As here shown, the operating device 23 is in the form of a flat circular casing journaled on bushings 24 and 25 which are mounted on a tubular shaft 26, preferably by screw threading the same thereon. Coiled within the casing 23 is a flat spring 27 which is secured at one end to the wall of the casing 23 and at the other end to the shaft 26. The shaft 26 is rotatably mounted in the main frame but is held against rotation under the influence of the spring 27. As here shown, the inner end of the shaft is journaled on a stud 28, which may be secured to the base plate 1 by one of the screws 6 by means of which the device is attached to the camera. The outer end of the shaft projects beyond the outer frame member 1 and is provided with a handle 29 by means of which it may be rotated to wind the spring. Preferably the handle is detachable and, as here shown, it is provided with a stud 30 adapted to enter the outer end of the hollow shaft 26 and provided with pins 31 to enter pin slots 32 in the shaft. Rigidly secured to the outer bushing 24, which in turn is secured to the shaft, is a ratchet wheel 33 with which co-operates a spring pressed pawl 34 to prevent the rotation of the shaft in a reverse direction by the spring 27. The shaft and outer bushing 24 intersect the actuating plate and the latter is therefore provided with an opening 35 through which these parts extend and which is of ample size to permit of the necessary movement being imparted to the plate.

The operating device, or casing, 23 is held normally against rotation by means of a stop 36 arranged normally in the path of a projection mounted on the periphery of the circular casing constituting the operating device and here shown as a roller 37, there being three of these rollers spaced equal distances about the periphery of the casing. The stop 36 is carried by a plate 38 pivotally mounted on the base plate 1, as shown at 39, and held in contact therewith by a pin 40 extending through a curved slot 41 in the plate 38. The stop 36 is held normally in its innermost operative position by means of a spring 42 and the plate 38 is provided with a finger piece, or handle, 43 by means of which it may be actuated to move the stop into an inoperative position and thus permit the operating device to be actuated by the spring. So long as the stop is held in its inoperative position the casing will rotate and will cause the film to be advanced three times for each complete rotation thereof. As soon as the stop is released it will be automatically moved into its operative position by the spring 42 and prevent further movement of the operating device.

In order to prevent unequal length of film being advanced by the film feeding device upon successive operations thereof, due to the increased diameter of the roll of film on the film spool, I have provided means for automatically controlling the amount of movement imparted to the plate 14, and, as here shown, this means comprises a cam 44 arranged in the path of a lug 45 carried by the plate, whereby the cam constitutes a stop to limit the return movement of the plate under the influence of the spring. The cam is rotated upon each operation of the plate to bring into line with the lug 45 successive portions thereof, each of an increased radius, thereby shortening the return movement of the plate after each operation thereof. In the present device this adjustment of the cam is accomplished by securing thereto a ratchet wheel 46 which is engaged and operated by a pawl 47 pivotally mounted on the end of the actuating plate beyond its axis. The axis of the pawl is spaced a relatively short distance from the axis of the plate and the movement thereof will be sufficient to impart the desired amount of movement to the cam upon each operation. The ratchet 46 may be held against movement in a reverse direction in any suitable manner as by a spring washer 48. The cam 44 is returned to a normal position by a finger piece 63 which may be associated with an index on the casing 61 which indicates the amount of film which has been exposed.

I have also provided the mechanism with a shutter actuating device, the movement of which is controlled by the operating device 23. As here shown, the shutter actuating device comprises a lever, or arm, 49 pivotally mounted at 50 on a bracket 51 mounted on the base plate 1. That end of the lever opposite its axis is provided with a head, or socket, member, 52, pivotally connected thereto to permit it to have a slight swinging movement on the lever. This socket member is adapted to receive the plunger 53 on the end of the operating rod 54 of the usual shutter operating device of a camera, which comprises a flexible rod 54 mounted in a flexible casing 55. The end of the casing 55 is secured to the base plate 1 in line with the socket member 52 of the lever, preferably by inserting the same in a slot in the base plate. Consequently, the movement of the lever 49 about its axis will operate the rod 54 to actuate the shutter. The lever is provided between its ends with a laterally extending projection 56 arranged in an inclined plane and in the path of the projections, or rollers, 37, secured to the periphery of the operating device. As the operating device rotates the rollers will successively pass over the inclined projection 56 and actuate the shutter, the lever being restored to its normal position after each operation by the outward pressure on the rod 54.

I also prefer to provide the device with a governor to regulate the speed at which it operates and, as here shown, a fan brake, 57, is mounted on a stud 58 carried by the base plate 1 and is connected by a train of gearing 59 with a gear 60 secured to the casing 23 on which the operating device is mounted. The device as a whole is included in a casing 61 which is placed over a main frame and may be secured in a position thereon in any suitable manner.

In the present camera the exposures on the film are of much smaller size than the normal exposure on a camera of this kind and in order to properly define the limits of the exposure I have provided a supplemental back 62 having an opening the size of the exposure.

While I have shown and described one embodiment of my invention I wish it to be understood that I do not desire to be limited to the details thereof as various modifications may occur to a person skilled in the art.

Having now fully described my invention what I claim as new and desire to secure by Letters Patent, is:

1. In a mechanism of the character described, a film feeding device comprising an actuating member, a spring to move said actuating member in one direction, a shutter actuating mechanism comprising a movable part, and a spring actuated operating device having parts arranged respectively to engage said actuating member and move the same against the tension of said spring, and to engage said movable part of said shutter actuating device to cause said shutter to operate.

2. In a mechanism of the character described, a film feeding device comprising an oscillatory actuating member, a spring to move said actuating member in one direction, a shutter actuating device comprising a pivoted member, an operating device having a series of projections arranged to successively engage said actuating member and move the same against the tension of said spring and having a second series of projections arranged to successively engage said pivoted member of said shutter actuating device, and means to actuate said operating device.

3. In a mechanism of the character described, a film feeding device comprising an actuating member, means for supporting a shutter actuating device adjacent to said actuating member, a lever arranged in operative relation to said shutter actuating device, and a rotary operating device having a part extending in one direction to engage and operate said film actuating member and having a part extending in another direction to engage and operate said lever.

4. In a mechanism of the character described, a film feeding device comprising an actuating member, means for supporting a shutter actuating device adjacent to said actuating member, a lever arranged in operative relation to said shutter actuating device, a rotary operating device comprising a casing having parts to respectively engage and operate said actuating member and said lever, and a spring arranged within and operatively connected with said casing.

5. In a mechanism of the character described, a film feeding device comprising an actuating member, means for supporting a shutter actuating device adjacent to said actuating member, a lever arranged in operative relation to said shutter actuating device, and a spring actuated rotary operating member having on one face thereof a projection to engage and operate said actuating member and having on the periphery thereof a projection to engage and operate said lever.

6. In a mechanism of the character described, a film feeding device, an actuating member therefor, shutter actuating mechanism comprising a movable member, a rotatable operating member having parts arranged to engage the first mentioned members and operate said film feeding device and said shutter actuating mechanism, a spring acting on said operating member to rotate the same continuously in one direction, and means for controlling the movement of said operating device under the influence of said spring.

7. In a mechanism of the character described, a film feeding device, a shutter actuating device, an operating device comprising a rotary casing, said casing having separate parts fixed with relation one to the other and arranged respectively to impart movement to said film feeding device and said shutter actuating device, a spring wound within said casing and connected therewith to impart rotary movement thereto, means for placing said spring under tension, and means for controlling the movement of said operating device by said spring.

8. In a mechanism of the character described, a film feeding device, a shutter actuating device, an operating device comprising a casing rotatably mounted on a normally stationary shaft, said casing having two series of projections, the projections of one series being arranged to successively actuate said film feeding device and the projections of the other series being arranged to successively operate said shutter actuating device, a spring mounted in said casing and connected at one end with the casing and at the other end with said shaft, means for rotating said shaft to place said spring under tension, and means for holding said shaft against rotation under the influence of said spring.

9. In a device of the character described, a frame comprising parallel plates spaced one from the other, a film feeding device carried by said frame, a shutter actuating device carried by said frame, a shaft rotatably mounted in said frame, means to hold said shaft against rotation in one direction, bushings mounted on said shaft, a casing rotatably mounted on said bushings and having separate parts arranged respectively to operate said film feeding device and said shutter actuating device, and a spring mounted within said casing and having one end connected therewith and the other end connected with said shaft.

10. In a device of the character described, a film feeding device, a shutter actuating device, a spring operated rotary operating device for actuating said film feeding device and said shutter actuating device, said operating device having a part forming a stop, and a stop mounted adjacent to said operating device and movable into and out of the path of said part of said operating device, and a spring for holding said last mentioned stop in operative relation to said part of said operating device.

11. In a mechanism of the character described, a film feeding device comprising a gear, means for operatively connecting said gear with a film spool, an oscillating actuating member having teeth to cooperate with teeth of said gear, a rotary operating device having means to impart movement to said oscillatory actuating member, and means for imparting rotary movement to said operating device.

12. In a mechanism of the character described, a film feeding device comprising a gear, means for operatively connecting said gear with a film spool, an oscillating actuating member having teeth to cooperate with teeth of said gear, a rotary operating device having means to impart movement to said oscillatory actuating member, and a spring for imparting rotary movement to said operating device.

13. In a mechanism of the character described, a film feeding device comprising a gear, means for operatively connecting said gear with a film spool, an oscillating actuating member having teeth to cooperate with teeth of said gear, a rotary operating device having means to impart movement to said oscillatory actuating member, a spring for imparting rotary movement to said operating device, and means to control the movement of said operating device by said spring.

14. In a mechanism of the character described, a film feeding device comprising a gear, means for operatively connecting said gear with a film spool, an actuating member pivotally supported at a point remote from said gear and having teeth to cooperate with said gear, a rotary operating device, said operating device and said actuating member having contacting parts to cause the actuating member to be moved in one direction by the operating device, means for moving said actuating member in the other direction, and means for imparting rotary movement to said operating device.

15. In a mechanism of the character described, a film feeding device comprising a gear, means for operatively connecting said gear with a film spool, an actuating member pivotally supported at a point remote from said gear and having teeth to cooperate with said gear, a rotary operating device mounted on an axis arranged between the ends of said actuating member, said actuating member and said operating device having contacting parts to cause the actuating member to be actuated by the operating device, means for restoring said actuating member to its initial position, and means for actuating said operating device.

16. In a mechanism of the character described, a film feeding device comprising a gear, means for operatively connecting said gear with a film spool, an actuating member pivotally mounted at a point remote from said gear and having teeth cooperating with said gear to rotate said spool, an operating device rotatably mounted in a plane parallel with said actuating member and on an axis arranged between the ends of said actuating member, said actuating member having a projection extending toward said operating device, and said operating device having a plurality of projections adapted to be brought successively into engagement with the projection on said actuating member, means for moving said actuating member, to its normal position when it has been released by said operating device, and means for rotating said operating device.

17. In a mechanism of the character described, a film feeding device comprising a gear, means for operatively connecting said gear with a film spool, an actuating member pivotally supported at a point remote from said gear and having teeth to coöperate with said gear, a rotary operating device, said operating device and said actuating member having contacting parts to cause the actuating member to be actuated by the operating device, means for restoring said actuating member to its initial position, a spring for continuously rotating said operating device, and means for controlling the rotation of said operating device.

18. In a mechanism of the character described, a film feeding device comprising a gear, means for operatively connecting said gear with a film spool, an actuating member pivotally mounted at a point remote from said gear and having teeth coöperating with said gear to rotate said spool, an operating device rotatably mounted in a plane parallel with said actuating member and on an axis arranged between the ends of said actuating member, said actuating member having a projection extending toward said operating device, and said operating device having a plurality of projections adapted to be brought successively into engagement with the projection on said actuating member, means for moving said actuating member to its normal position when it has been released by said operating device, a spring for continuously rotating said operating device, a series of projections carried by said operating device, and a stop movable into and out of the path of the last mentioned projections to control the rotation of said operating device.

19. In a mechanism of the character described, a film feeding device comprising a gear, means for operatively connecting said gear with a film spool, an oscillatory actuating member having teeth cooperating with said gear to rotate said spool, an operating device acting on said actuating member to move the same to a predetermined point, automatically operated means to check the return movement of said actuating member in a different position upon each operation of said actuating member, and means for imparting movement to said operating device.

20. In a mechanism of the character described, a film feeding device comprising a gear, means for operatively connecting said gear with a film spool, an actuating member having teeth cooperating with said gear to rotate said spool, an operating device acting on said actuating member to move the same to a predetermined point, an adjustable stop to limit the return movement of said actuating member, adjusting means for said stop operatively connected with said actuating member, and means for imparting movement to said operating device.

21. In a mechanism of the character described, a film feeding device comprising a gear, means for operatively connecting said gear with a film spool, an actuating member having teeth cooperating with said gear to rotate said spool, an operating device acting on said actuating member to move the same to a predetermined point, a cam forming a stop to limit the return movement of the said actuating member, adjusting means for said cam operatively connected with said actuating member, and means for imparting movement to said operating device.

22. In a mechanism of the character described, a film feeding device comprising a gear, means for operatively connecting said gear with a film spool, an actuating member pivotally mounted at a point remote from said gear and having teeth cooperating with said gear to rotate said spool, a rotary operating device mounted adjacent to said actuating member to move the same periodically to a predetermined point, means for returning said actuating member toward its initial position, a cam forming a stop to limit the return movement of said actuating member, a ratchet wheel connected with said cam, a pawl connected with said actuating member beyond the axis thereof and cooperating with said ratchet wheel to change the position of said cam upon each operation of said actuating member, and means for rotating said operating device.

23. In a mechanism of the character described, a film feeding device comprising an actuating member, a shutter mechanism comprising a lever having a projection thereon, a rotary operating device having a part to impart operative movement to the actuating member for said film feeding device and to then release the same, and having another part to ride over the projection on said shutter actuating lever and thereby actuate the same, and means for rotating said operating device.

24. In a mechanism of the character described, a film feeding device comprising a gear adapted to be operatively connected with a film spool, an actuating member pivotally mounted at a point remote from said gear and having teeth to mesh with said gear, and also having a projection extending from one face thereof, a shutter actuating lever pivotally mounted adjacent to said actuating member and having an inclined projection, a rotary operating device mounted on an axis between the ends of said actuating member and having on the face thereof a projection adapted to engage the projection on said actuating member and having on the periphery thereof a projection adapted to engage the inclined projection on said shutter actuating lever, and means for rotating said operating device.

25. In a mechanism of the character described, a film feeding device comprising a gear adapted to be operatively connected with a film spool, an actuating member pivotally mounted at a point remote from said gear and having teeth to mesh with said gear, and also having a projection extending from one face thereof, a shutter actuating lever pivotally mounted adjacent to said actuating member and having an inclined projection, a rotary operating device mounted on an axis between the ends of said actuating member and having on that face thereof adjacent to said actuating member a plurality of projections arranged to successively engage the projection on said actuating member, and having on its periphery a similar plurality of projections to successively engage the inclined projection on said shutter actuating lever, means to move said actuating member toward its initial position, and a spring acting on said operating device to rotate the same continuously in one direction.

26. In a mechanism of the character described, a film feeding device comprising a gear adapted to be operatively connected with a film spool, an actuating member pivotally mounted at a point remote from said gear and having teeth to mesh with said gear, and also having a projection extending from one face thereof, a shutter actuating lever pivotally mounted adjacent to said actuating member and having an inclined projection, a rotary operating device mounted on an axis between the ends of said actuating member, and having on that face thereof adjacent to said actuating member a plurality of projections arranged to successively engage the projection on said actuating member, and having on its periphery a similar plurality of projections to successively engage the inclined projection on said shutter actuating lever, means to move said actuating member toward its initial position, and a spring acting on said operating device to rotate the same continuously in one direction, and a stop mounted adjacent to said operating device and movable into and out of the path of the projections on the periphery thereof.

27. In a mechanism of the character described, a film feeding device comprising a gear adapted to be operatively connected with a film spool, an actuating member pivotally mounted at a point remote from said gear and having teeth to mesh with said gear, and also having a projection extending from one face thereof, a shutter actuating lever pivotally mounted adjacent to said actuating member and having an inclined projection, a rotary operating device mounted on an axis between the ends of said actuating member, and having on that face thereof adjacent to said actuating member a plurality of projections arranged to successively engage the projection on said actuating member and having on its periphery a similar plurality of projections to successively engage the inclined projection on said shutter actuating lever, means to move said actuating member toward its initial position, a spring acting on said operating device to rotate the same continuously in one direction, and a fan constituting a brake and having a geared connection with said rotary operating device.

In testimony whereof, I affix my signature hereto.

WILLIAM ASBURY.